(12) United States Patent
Ederer et al.

(10) Patent No.: US 10,093,065 B2
(45) Date of Patent: Oct. 9, 2018

(54) DEVICE AND METHOD FOR 3D PRINTING METHODS, WITH ACCELERATED EXECUTION

(71) Applicant: Voxeljet AG, Friedberg (DE)

(72) Inventors: Ingo Ederer, Geltendorf (DE); Daniel Günther, München (DE)

(73) Assignee: VOXELJET AG, Friedberg (DE)

( * ) Notice: Subject to any disclaimer, the term of this patent is extended or adjusted under 35 U.S.C. 154(b) by 20 days.

(21) Appl. No.: 15/105,708

(22) PCT Filed: Dec. 15, 2014

(86) PCT No.: PCT/DE2014/000631
§ 371 (c)(1),
(2) Date: Jun. 17, 2016

(87) PCT Pub. No.: WO2015/096826
PCT Pub. Date: Jul. 2, 2015

(65) Prior Publication Data
US 2016/0318251 A1  Nov. 3, 2016

(30) Foreign Application Priority Data
Dec. 23, 2013 (DE) .................. 10 2013 021 891

(51) Int. Cl.
| B29C 64/165 | (2017.01) |
| B29C 64/20 | (2017.01) |
| B29C 64/205 | (2017.01) |
| B29C 67/00 | (2017.01) |
| B33Y 10/00 | (2015.01) |

(52) U.S. Cl.
CPC ........ *B29C 67/0081* (2013.01); *B29C 64/165* (2017.08); *B33Y 10/00* (2014.12)

(58) Field of Classification Search
None
See application file for complete search history.

(56) References Cited

U.S. PATENT DOCUMENTS

| 5,387,380 A * | 2/1995 | Cima .................. B05C 19/04 |
| | | 264/109 |
| 8,741,194 B1 | 6/2014 | Ederer et al. |
| 2001/0050448 A1 | 12/2001 | Kubo et al. |
| 2002/0105114 A1 * | 8/2002 | Kubo .................. B29C 64/165 |
| | | 264/497 |
| 2004/0026418 A1 | 2/2004 | Ederer et al. |
| 2004/0035542 A1 | 2/2004 | Ederer et al. |

(Continued)

FOREIGN PATENT DOCUMENTS

| DE | 102007040755 A1 | 3/2009 |
| DE | 102010015451 A1 | 10/2011 |

(Continued)

OTHER PUBLICATIONS

International Search Report, Application No. PCT/DE2014/000631, dated Apr. 20, 2015.

(Continued)

*Primary Examiner* — Mary F Theisen
(74) *Attorney, Agent, or Firm* — The Dobrusin Law Firm, P.C.

(57) ABSTRACT

The invention relates to a device and a method for 3D printing with accelerated method execution.

22 Claims, 10 Drawing Sheets

(56) References Cited

U.S. PATENT DOCUMENTS

| | | |
|---|---|---|
| 2004/0170765 A1 | 9/2004 | Ederer et al. |
| 2005/0017394 A1 | 1/2005 | Hochsmann et al. |
| 2005/0093208 A1* | 5/2005 | Boyd .................. B29C 67/0059 |
| | | 264/442 |
| 2005/0167872 A1 | 8/2005 | Ederer et al. |
| 2006/0105102 A1 | 5/2006 | Hochsmann et al. |
| 2006/0108090 A1 | 5/2006 | Ederer et al. |
| 2006/0176346 A1 | 8/2006 | Ederer et al. |
| 2006/0237159 A1 | 10/2006 | Hochsmann |
| 2008/0001331 A1 | 1/2008 | Ederer |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0260945 A1 | 10/2008 | Ederer et al. |
| 2009/0261497 A1 | 10/2009 | Ederer et al. |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0272519 A1 | 10/2010 | Ederer et al. |
| 2010/0291314 A1 | 11/2010 | Kashani-Shirazi |
| 2011/0223437 A1 | 9/2011 | Ederer et al. |
| 2011/0308755 A1 | 12/2011 | Hochsmann |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0202381 A1 | 7/2014 | Ederer et al. |
| 2014/0212677 A1 | 7/2014 | Gnuchtel et al. |
| 2014/0227123 A1 | 8/2014 | Gunster |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0107387 A1* | 4/2016 | Ooba .................. B29C 67/0081 |
| | | 264/128 |
| 2016/0114533 A1 | 4/2016 | Grasegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |

FOREIGN PATENT DOCUMENTS

| | | |
|---|---|---|
| DE | 102011111498 A1 | 2/2013 |
| EP | 0431924 A2 | 6/1991 |
| WO | 2004/06041 A2 | 12/2004 |

OTHER PUBLICATIONS

Written Opinion of the International Search Authority, Application No. PCT/DE2014/000631, dated Apr. 20, 2015.

* cited by examiner

DEVICE AND METHOD FOR 3D PRINTING METHODS, WITH ACCELERATED EXECUTION

CLAIM OF PRIORITY

This application is a national phase filing under 35 USC § 371 from PCT Application serial number PCT/DE2014/000631 filed on Dec. 15, 2014, and claims priority therefrom. This application further claims priority from German Patent Application DE 10 2013 021 891.8 filed on Dec. 23, 2013. PCT Application Number PCT/DE2014/000631 and German Patent Application Number DE 10 2013 021 891.8 are each incorporated herein in their entireties by reference.

The invention relates to a method and a device for producing three-dimensional models at increased process speeds.

A method for producing three-dimensional objects from computer data is described in the European patent specification EP 0 431 924 B1. In this method, a particulate material is applied in a thin layer to a platform, and a binder material is selectively printed onto the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is reached. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which powder deposits are removed, for example by manual brushing.

Of all the layering techniques, 3D printing based on powdered materials and the supply of liquid binder is the fastest method.

This method may be used to process different particulate materials, including natural biological raw materials, polymers, metals, ceramics and sands (not an exhaustive list).

The inclined printing method described in DE 10 2010 015 451 is particularly economical. In this case, the particulate material is built on a conveyor belt in the form of a "powder cake." A printing area and an unpacking area are formed. The device operates continuously, and the operation is not interrupted by unpacking processes.

Additive manufacturing methods are no longer used exclusively for building prototypes. Instead, the batch limits at which conventional, tool-based production methods are more cost-effective are on an upward trend.

Up to now, however, additive manufacturing has been an attractive option for series production only in the range of small batches of up to approximately 10,000 identical parts. The production times on the 3D printing machines, also referred to as volume capacity, are an important cost factor. The 3D printing machines currently known and available on the market have too low a volume capacity for producing large batches in order to compete economically with other known technologies and production methods.

The 3D printing machines and methods known from the prior art have been much improved over the years in terms of the materials that can be used and the quality features. However, no satisfactory approaches to increasing the volume capacity while maintaining the same quality standards have yet been found. In addition, previous suggestions on ways to increase the process speed were unable to meet the requirements of higher batch production or even mass production, since many different parameters have to be harmonized and coordinated, which has proven to be difficult. Up to now, this problem has remained unsolved, even though manufacturers have been working with 3D printing methods for decades now.

There has thus long been the need for a 3D printing method and corresponding printing machines to be available in order to use the advantages of 3D printing while simultaneously meeting the volume and quality requirements of large batches.

One object of the present invention was therefore to provide a method and a device, which could be used to significantly increase the production capacity of powder bed-based 3D printers and 3D printing methods.

Another object was to increase the volume of the 3D printing machines and methods, while simultaneously retaining a high quality standard.

Lastly, one object was to reduce or essentially eliminate the disadvantages of the prior art or to overcome them entirely.

A number of attempts to solve the problems illustrated above are known from the prior art, but they have up to now not been able to provide a truly satisfactory approach.

Compared to competing methods, such as selective laser sintering or the FDM method, powder bed-based 3D printing is superior when it comes to speed. First of all, this is due to the coater technology, with the aid of which a significant portion of the component mass is quickly applied in the form of powder. Secondly, it is due to the use of ink-jet print heads having thousands of individually controllable nozzles.

One approach toward speeding up the system is to increase the travel velocities of the individual components. In the case of the coater, this means increasing the throughput through the system. However, a procedure of this type is limited by certain properties of the particulate material. If the speed is increased beyond a certain amount, underlying layers are damaged by the coater.

The same approach is taken when increasing the print speed. However, limiting factors exist here as well. For example, speeds of far more than 0.5 m/s are uncommon in piezo-based ink-jet print heads, because the edge sharpness of the print image deteriorates significantly.

The size of the print head is also a factor that greatly influences the system speed. A print head that is small relative to the build space may be guided over the build space in a meandering manner to cover all areas. This generally takes a not inconsiderable amount of layering time. Doubling the print width may cut the print time nearly in half, depending on the system design. Print heads that are able to print the entire build space in one straight pass are not uncommon according to the prior art.

The volume capacity achievable hereby, however, is insufficient for true mass production.

A number of terms in the invention are explained in greater detail below.

Within the meaning of the invention, "3D printing methods" relate to all methods known from the prior art which facilitate the construction of components in three-dimensional molds and are compatible with the described process components and devices. In particular, these are powder-based methods, for example SLS (selective laser sintering).

Within the meaning of the invention, "selective binder application" or "selective binder system application" or "selective binder fluid application" may take place during each particulate material application or irregularly, depending on the requirements of the molded body and for the purpose of optimizing the production of the molded body, i.e., non-linearly and not in parallel after each particulate material application. "Selective binder application" or "selective binder system application" may thus be set individually and during the course of producing the molded body.

"Molded body" or "component" or "3D molded part" or "model" within the meaning of the invention are all three-dimensional objects that are produced with the aid of the method according to the invention and/or the device according to the invention and which have a nondeformability.

Any known 3D printing device that contains the necessary components may be used as the "device" for carrying out the method according to the invention. Common components include a coater, a build space, a means for moving the build space or other components, a dosing device and a heating means and other components which are known to those skilled in the art and therefore do not need to be listed in greater detail here.

All materials known for powder-based 3D printing, in particular sands, ceramic powders, metal powders, plastics, wood particles, fibrous materials, celluloses and/or lactose powders, may be used as "particulate materials." The particulate material is preferably a dry, free-flowing powder, although a cohesive, firm powder may also be used.

"Build space" is the geometric place in which the particulate material feedstock grows during the build process by repeated coating with particulate material. The build space is generally delimited by a base, the building platform, by walls and an open cover surface, the build plane.

"Device means" within the meaning of the invention are all means contained in a device according to the invention for carrying out the method according to the invention, such as a coater, print head, building platform, control units, job box, guide rails, driving means, etc.

"Process unit" within the meaning of the invention may be combinations of device means, such as the coater and print head, which are preferably arranged together or coupled and are preferably moved together at the same or a coordinated speed and arrangement or direction.

A "build container" within the meaning of the invention implements a build space. It therefore has a base, walls and an open access area, the build plane. The build container always includes parts which do not move relative to the frame of the 3D printing device. Removable build containers make it possible to operate the machine more or less continuously. While the parts of a first building operation are being unpacked, new parts may be printed within the machine in a second build container.

In this publication, "coater" designates a technical unit which is able to store, dose and simultaneously level and smooth particulate material. According to the invention, a 3D printing device may have multiple coaters. Multiple coaters may share certain functional units. Device parts of this type are also referred to as "coater means."

In this publication, "dosing device," "print head" and "ink-jet print head" are named synonymously with the term, selective solidification unit. This primarily means a system that is able to apply matrix-like data in the form of microdroplets of a binder fluid to the build space on the basis of digital control signals. However, laser-based methods may also represent a solidification unit of this type. Device parts of this type are also referred to as "printing means."

"Line head" refers to a print head at least as wide as the entire build space and able to cover this build space with liquid or "information," according to the resolution.

"Information" is an abstraction. In the method according to the invention, "information" may be a local bonding. This may take place due to liquid or the supply of energy. The term, information, is used, since only properties are changed at a position. This is often the property of strength. However, this is not obligatory.

The "printing and coater plane" is the abstraction of the location of the building process currently in progress. Since the dosing unit and the coater are structurally moved in the device on a positioning unit with shared components at nearly one height, the "printing and coater plane" is viewed in this description as being situated at the upper edge of a newly dispensed layer.

The "building platform" within the meaning of the invention moves relative to the printing and coater plane. This relative movement takes place during the building process in interrupted movements in multiples of the layer thickness. It defines the actual layer thickness. In the inclined printing method described above, the building platform is a conveyor belt. The feed here is not the same as the layer thickness.

"Inclined printer" is a 3D printing device, in which coating and printing take place on a plane which is inclined relative to the horizontal. A powder cake is produced thereby, which is drawn off of the printing area layer by layer using a step conveyor. The material filament then ends in an unpacking area. The components are removed here, while the printer continues to produce. This description applies analogously to the term "inclined printing method."

"Proceed layer by layer" within the meaning of the invention designates the process of lowering the build space by the thickness of one layer or raising device parts located above the build space by the thickness of one layer in a job box or in another horizontal build plane. In a continuous method, "proceed layer by layer" designates the moving of the applied build material (the build material block in the print machine) by the thickness of one layer, so that a new layer of particulate material may be applied and a layer application and selective binder fluid application may thus take place continuously. This may occur at an angle to the building platform.

The inventors have now found a solution which makes it possible to significantly increase the volume capacity at a satisfactory level of quality.

The inventors were able to remove the limitations known from the approaches according to the prior art in that, according to the invention, the coating and printing operations are parallelized. If these operations are carried out essentially simultaneously, it is possible to dispose multiple coaters and print units consecutively and apply multiple layers and selectively solidify them in one pass. For this purpose, no increases in speed or other measures are needed which negatively influence the quality of the products produced.

Preferred specific embodiments are illustrated below.

In one aspect, the invention relates to a method for producing three-dimensional models by means of a layering technique, particulate build material being applied in a defined layer to a build space, and a binder fluid being selectively dispensed onto the build material, the build space being moved by a certain amount, and these steps are repeated until the desired object is produced, the steps of application and dispensing taking place essentially simultaneously.

Due to this method execution according to the invention, a higher volume speed at an acceptable quality of the molded parts was able to be advantageously achieved.

Suitable device means, which are compatible with the other device means, are used to apply and dispense the various materials. The particulate build material is preferably applied with the aid of a coater, and/or the binder fluid is dispensed with the aid of a print head.

In the method according to the invention, the coater and print head are preferably arranged together, and the print head device means follows the coater device means at a defined distance, preferably at a distance of 300 mm to 1,000 mm, more preferably 50 mm to 300 mm, even more preferably directly.

In the method according to the invention, driving means are preferably provided, which drive and move the device means at a speed of 0.02 m/s to 1 m/s, so that different device means are moved at the same speed or at different speeds.

The method according to the invention may take place in different ways with regard to the positioning of the coater and print head device means. These device means, and possibly other device means, may be moved over the build space and then returned to their starting point. Alternatively, forward and return motions are used. The backward travel and the return motion of the device means take place at high speed, preferably at a speed of 0.5 m/s to 5 m/s.

In an alternative specific embodiment, in which the application and dispensing take place in a forward as well as a return motion, corresponding speeds are implemented.

In one preferred method, multiple coater and dosing unit device means are used, preferably 2 to 20 each, more preferably 4 to 15, so that multiple layers may be built in one pass. Multiple device means preferably form multiple layers in one pass, both in the forward motion and in the return motion.

The method according to the invention preferably builds multiple layers on a continuously operating conveyor unit with the aid of multiple device means or process units.

The method according to the invention may use an inclined printing method, a batch method and/or a continuous method as a base method.

One aspect of the invention is furthermore a device for producing three-dimensional models by means of a layering technique, which includes at least 2, preferably 3 to 20, printing means and at least 2, preferably 2 to 20, coater means situated downstream therefrom.

In another aspect, the invention relates to a device for producing three-dimensional models by means of a layering technique, which includes at least two coater means and at least two printing means.

These aspects of the device may also be implemented in a combined manner.

The device preferably is characterized in that the printing means and the coater means are disposed on the same axis.

The device preferably has a 1 to 2 ratio between printing means and coater means. The device also preferably includes at least one coater means before and behind or on both sides of the printing means.

The printing means may be designed in any suitable manner and is coordinated with the other device means. It is preferably designed as a line head. The printing means and the coater means are preferably moved at a speed of 0.02 m/s to 1 m/s.

In a device according to the invention, the printing means and the coating means may be disposed in such a way that they operate in a forward motion and a return motion. The printing means and the coating means are adjustable in different planes, preferably in height, preferably on the Z axis.

In the device according to the invention, the printing means and the coater means are disposed at an offset, preferably they are disposed so that they are able to apply and dispense layers above one another.

The device according to the invention may be designed as an inclined printer, a batch printer or a continuously operating printer.

It may also include a continuously operating conveyor unit.

The device according to the invention is preferably designed as an inclined printer, and/or the device means are disposed in a vertical carousel or in a wheel-like manner.

Other preferred specific embodiments are illustrated below.

According to the invention, a system is essentially used for building models in layers with the aid of ink-jet printing. The sequence according to the prior art is as follows: a layer of powder is applied to a building platform and leveled. A fluid is then printed onto the layer according to the layer data of the 3D model. The printed areas change one or multiple properties (strength, water solubility, etc.). The material often solidifies due to a binding component in the liquid binder (e.g., an adhesive). Binders in the form of powder components are also typical. The building platform is lowered after the printing process, and the process begins all over again.

These steps are repeated until the component is completely present in the constructed powder cake.

The method according to the invention differs therefrom by the fact that, while the layer of particulate material is being applied, printing already takes place on the layer being produced. Phases are, of course, present, on which only coating and only printing take place. However, a phase of simultaneous action always exists according to the invention.

A procedure of this type must be brought in line with the coater technology used. For example, if vibrations are applied, as is frequently the case in devices according to the prior art, the transfer thereof to the print head musts be structurally ruled out.

This parallelism enables the time for the printing operation to be more or less absorbed into the time for the coating operation.

A device according to the invention which makes use of this parallelism advantageously includes a so-called line head. This line head is able to print the entire build space in a single pass. The print head may then run immediately after the coater and complete the layer. In contrast to the devices according to the prior art, the return motion is carried out with an empty load, i.e., without coating or printing. Maximum travel velocities may be used.

To be able to make better use of the process acceleration to be achieved according to the invention, a second coater may be installed. In this device, the print head is surrounded to a certain extent by two coaters. A coating with simultaneous printing may thus take place in the forward and return motion of the device.

The layering times in a device of this type are usually limited in the direction of shorter times only by the possible coating speed. For example, up to 0.333 m/s may be achieved, depending on the material system. A build rate of 1 layer/3 s would result for one meter of build space. A layer thickness of 300 µm and a coater width of 1 m yields a volume capacity of approximately 0.1 l/s. This corresponds to 360 l/h. In devices according to the prior art, approximately 40 seconds are typical for a layer of this size. Consequently, the volume capacity is 10 times lower.

The greatest benefit of parallelizing the coating and printing processes is in the ability to stagger the print and coater units. The device described above, which includes 2 coaters and 1 print head, may also be designed to have 4 coaters and 3 print heads. The coaters and the print heads are offset in height relative to each other and each build one layer as a group.

A printer of this type deposits two layers in one pass. According to the above calculation, the layering time decreases to 1.5 seconds. The volume capacity increases to 720 l/h.

The number of units is, in principle, unlimited. Thus, one printer may also be equipped with more than 8 coaters and 7 print heads. The layering time now drops to less than 1 second. The volume capacity exceeds 1 m$^3$/h.

A continuously operating printing device may also be produced by using a very large number of print heads and coater units. This device would no longer fill a build container but operate on a conveyor belt. The production principle would resemble the one described in the publication DE 10 2010 015 451. The volume capacity is 540,000 l/h in a device having a width of 1 meter and approximately 1,500 coaters and print units.

A device of this type would be able to compete without problems with conventional production methods with regard to the cycle times.

The high investment costs of a device of this type may, in turn, be decreased by the use of positioning units for the process units. The process units are guided continuously and may be maintained outside the layering area. A revolving chain drive, or a wheel fitted with process units, is suitable for a system of this type.

BRIEF DESCRIPTION OF THE FIGURES, WHICH REPRESENT PREFERRED SPECIFIC EMBODIMENTS

EXEMPLARY EMBODIMENTS

The system according to the invention draws heavily on powder-based 3D printing. The mechanical engineering is augmented to meet the requirements according to the invention.

Figure 1:
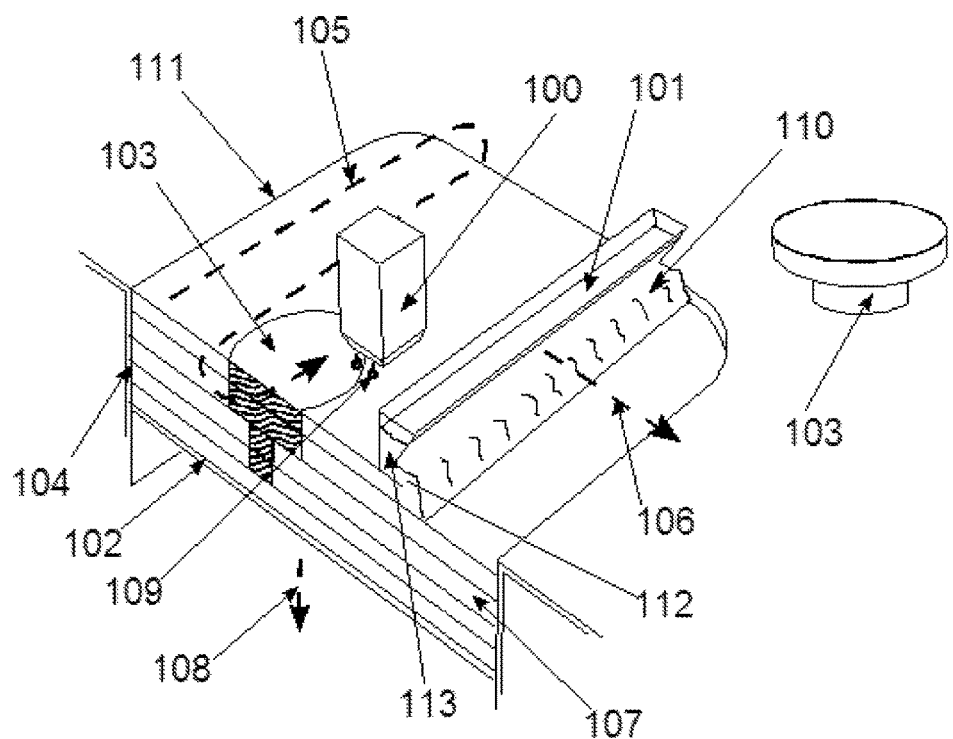
FIG. 1 shows a schematic representation of the components of a powder-based 3D printer as a sectional isometric view.
Figure 2:
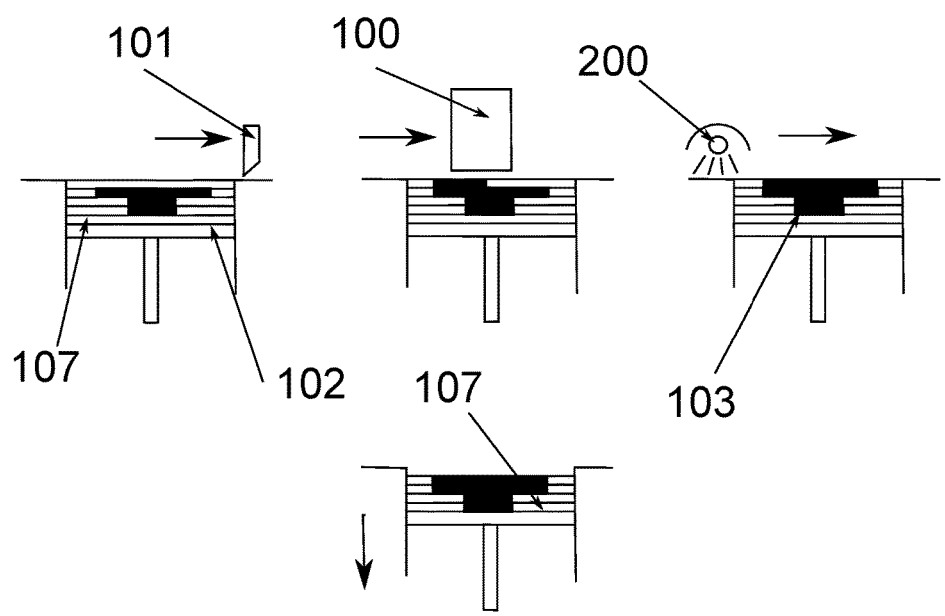
FIG. 2 shows a diagram of the sequence of a conventional 3D printing process.

A device according to the prior art has a powder coater (101) (FIGS. 1 and 2). Particulate material is applied thereby to a building platform (102) and smoothed (FIG. 2(a)). The applied particulate material may comprise a wide range of materials. For example, sands, ceramic powders, metal powders, plastic, wood particles, fibrous materials, celluloses, lactose powders, etc. may be used. The flow characteristics of these materials may vary enormously. Different coater techniques permit layering from dry, free-flowing powders and cohesive, firm powders to fluid-based dispersions. The height of powder layers (107) is determined by building platform (102). It is lowered after one layer has been dispensed. During the next coating operation, the resulting volume is filled and the excess smoothed.

After a coating process, a liquid is printed on the layer with the aid of an ink jet print head (100) (FIG. 2(b)). The print image corresponds to the section of the component at the present build height of the device. The fluid strikes and slowly diffuses into the particulate material.

Afterward, the layer may be optionally heated (FIG. 2(c)). For this purpose, an IR emitter (200), for example, may be passed over the build space. This IR emitter may be coupled with the axis of the coating system. Part of the liquid binding agent is evaporated during the heating process. In the case of liquids that present a fire hazard, the evaporating material is extracted immediately.

Following this optional heating process, building platform (102) is lowered by the height of the provided layer. The steps of layer construction, printing, heating and lowering are now repeated until desired component (103) is completely produced.

Figure 3:
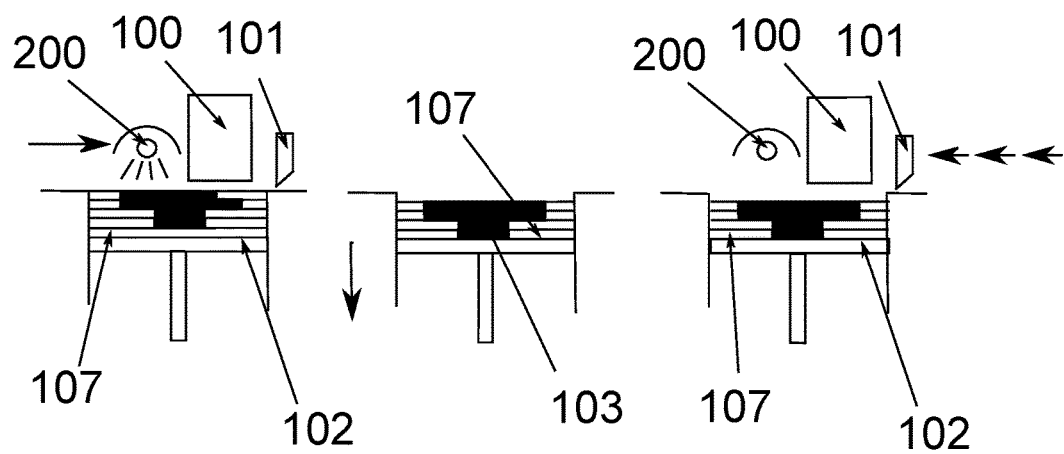
FIG. 3 shows an illustration of a printing process with parallel coating and printing according to the invention.

FIG. 3 shows the core idea of a method according to the invention. Coater (101) is immediately followed by print head (100). The print head solidifies the emerging component like in a device according to the prior art.

A device according to the invention takes into account the circumstance that vibrations may be transferred from the coater to the print head. For this purpose, structural measures are provided which either reduce vibrations or avoid their propagation across the machine components.

In this specific embodiment of the invention, the return motion takes place at high speed. Much higher speeds may thus be achieved than in the case of the coating operation. While the speed is a maximum of 0.3 m/s during the coating operation, more than 1 m/s may be traversed with return motion, using components according to the prior art.

Since the total layering time is composed of the time for the coating pass and the time for the return motion, the layering time decreases significantly. The difference is the time for a printing pass minus the time for the return motion.

According to the invention, devices which furthermore reduce idle times are preferred. These idle times are the refilling operations for particulate material and fluid. The latter are supplied to the units via flexible hoses, a pipe or a groove system. Missing material may be replaced thereby during the ongoing process.

The print head cleaning system must also be adapted. This should make a cleaning operation possible during one pass in the direction of the build space to accommodate the increase in capacity.

After the printing and coating process is finished, the building platform is lowered by the thickness of one layer, and the process starts over.

The invention may also be designed as a so-called inclined printer. In this case, the coating and printing operations take place on a tilted plane with respect to the horizontal, as described in the publication DE 10 2010 015 451.

A parallelization may also take place here. The process of lowering by the thickness of one layer is designed as a traversing of the conveyor belt.

Figure 4:
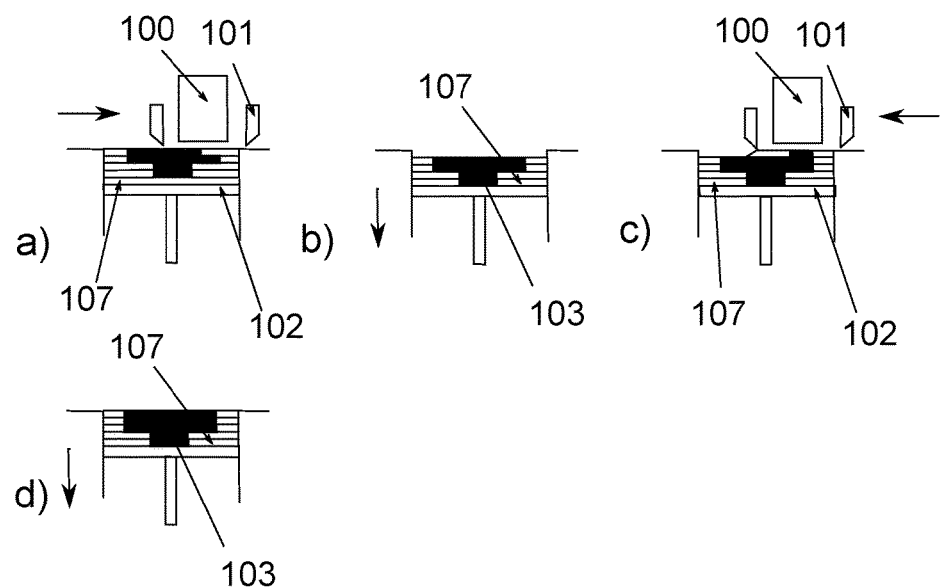
FIG. 4 shows a device during printing in a forward and return motion according to the invention.

The return motion represents an unused period of time in the sense of the process speed. A coater unit may therefore be added to the device according to the invention. The coaters are now disposed upstream and downstream from the print head, such as illustrated in FIG. 4. The building platform is lowered by one layer thickness before the return motion. And this also takes place before the forward motion following the completed pass.

This device may be used for simultaneous coating and printing with forward and return motion. The result is a further reduction in the time per layer. The time for a pass at the coating speed must also be calculated.

Within the meaning of the invention, the printer (100) and coater (101) units may be combined into one process unit. A coater may be added thereto if the forward and return motions are to be used.

Figure 5:
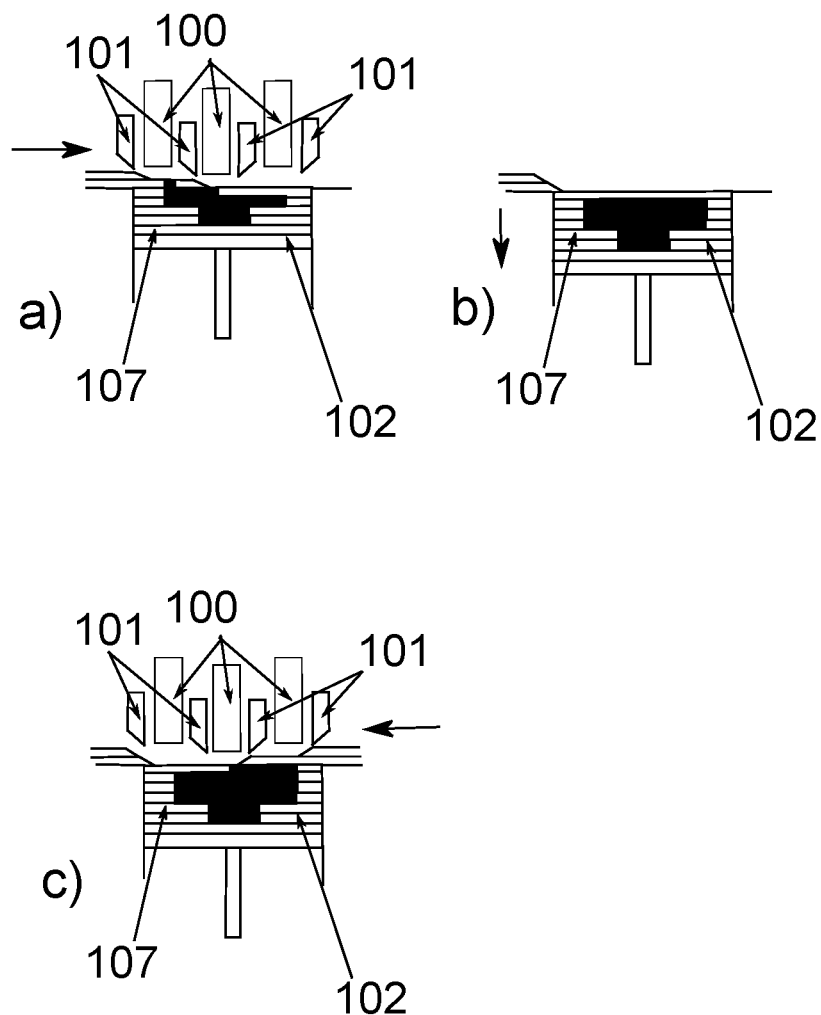
FIG. 5 shows a device, which includes staggered coaters and print heads according to the invention.

As shown in FIG. 5, process units may be offset by one layer thickness. It is now possible to build two layers simultaneously during a single pass. This is possible with forward and return motions. The layering time for the forward and return motion is cut in half for each process unit.

A special feature compared to printers according to the prior art occurs on the edge of the build container. Layers are built here which are higher than the lowest print head during the return motion. The system must therefore be designed in such a way that a coater which is able to hold the particulate material away from the print head by pushing the powder into a well situated farther to the outside is located upstream from the lowest print head.

Figure 6:
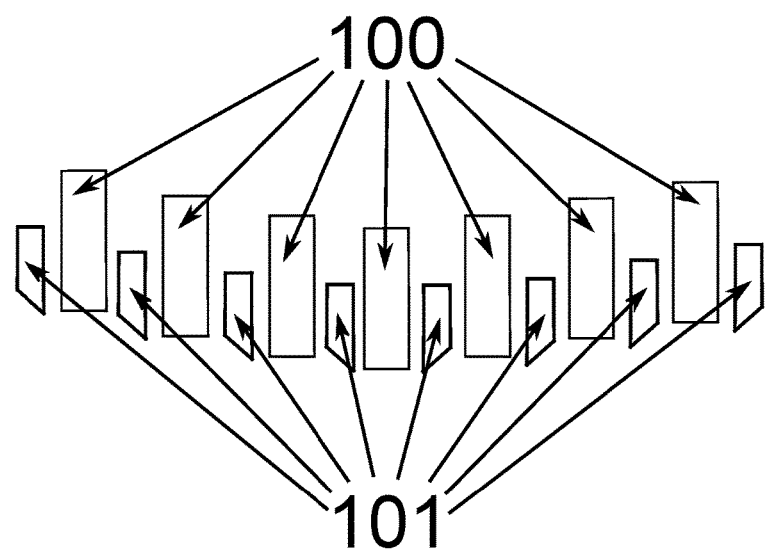
FIG. 6 shows a device, which includes 7 print heads and 8 coaters according to the invention.

A device of this type may be expanded nearly arbitrarily. FIG. 6 shows a system of 4 process units for forward and return motion. This device comprises 7 print heads and 8 coaters. As shown in FIG. 5, during a forward or return motion, a trailing coater may deposit particulate material while a leading coater is prevented from depositing a particulate material.

The correlation between layers n per pass and number of coaters b or number of print heads d is as follows:

$$d = n \cdot 2 - 1$$

$$b = n \cdot 2.$$

This correlation shows that large investments are necessary for a device of this type. Cost-intensive components remain unused during a pass. Print heads (100) and coaters (101) counted from the center outward in the direction of travel do not operate. The use time is consequently 50%.

Figure 7:
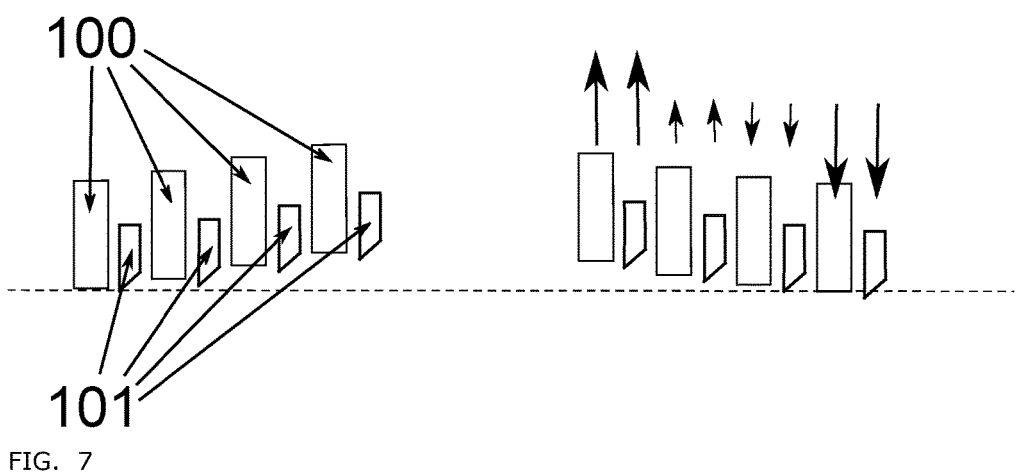
FIG. 7 shows a device, which includes movable units according to the invention.

It is possible to take this circumstance into account by designing the individual components—coaters (101) and print heads (100)—to be movable, such as illustrated in FIG. 7. It is sufficient to define two limit positions for each element. A moving device of this type may have a cost-effective design, compared to using coaters (101) and print heads (100) that are not fully used. As another effect, the process system width is reduced, and the entire device may be designed to save space.

Figure 8:
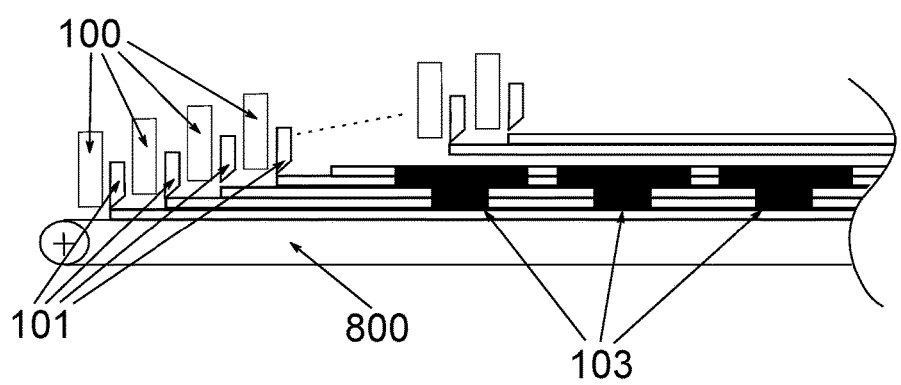
FIG. 8 shows a device, which operates on a conveyor belt according to the invention.

Using a great many process units (100, 101) facilitates another embodiment of the invention (FIG. 8). If as many units are disposed as are required by the necessary build space height, printing may take place on a conveyor belt (800), similarly to the principle of the inclined printer described above.

According to this principle, there are no more idle times. Volume capacity $V_{Point}$ may be easily calculated by means of travel velocity v, print width b and build space height h:

$$V_{Point} = b \cdot h \cdot v$$

In a device of this type, the process system comprising the process units must be swiveled away from conveyor belt (800) for maintenance. During this operation, a second process system may be swiveled in, so that no significant down time occurs.

Figure 9:
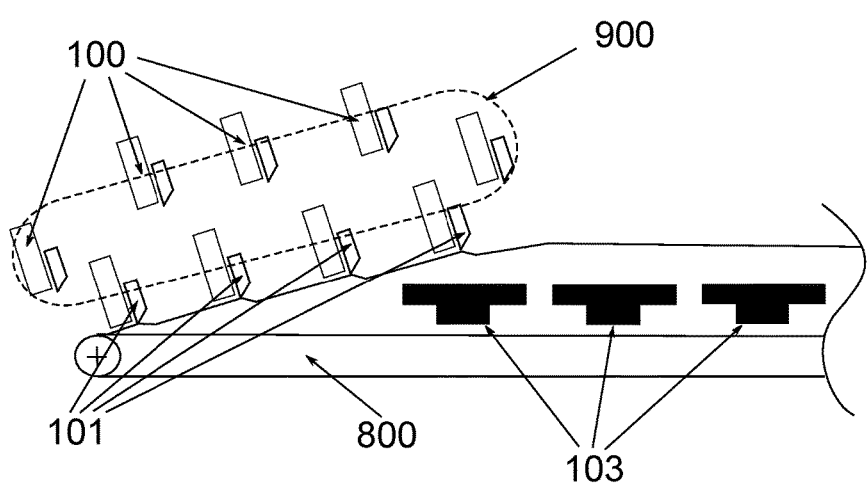
FIG. 9 shows a device according to the invention.

As described above, this problem and the high investment costs may be mitigated by disposing process units in a continuous system (FIG. 9). The inclined printer principle is used as a basis, it also being possible for conventional devices to serve as a basis. Deviating from the above descriptions, the parallel principle may not be implemented by process units having a back and forth motion. After the forward motion of a unit, the latter is raised and moved back above the layering area. Print head and coater cleaning stations may be mounted in this area. Drive (900) may be executed by means of a chain or a belt. Precision guides are used in the layering area.

The layer thickness in this device may be set separately for each process unit. All units may thus be moved in parallel to the build angle of the device.

Figure 10:
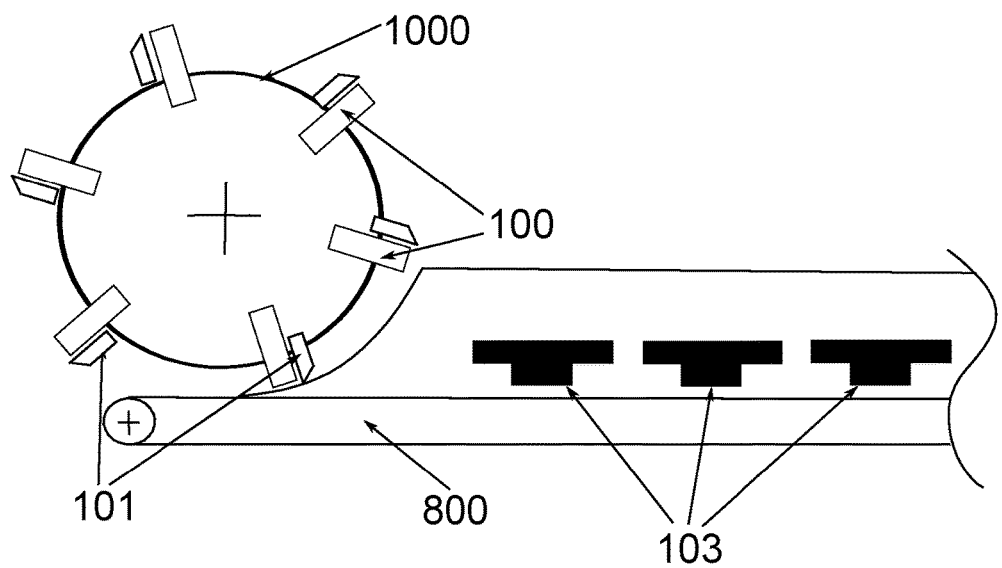
FIG. 10 shows a device according to the invention.

The process units may also be disposed on a wheel (1000), such as illustrated in FIG. 10. The units may rotate relatively in the wheel direction. They are then always perpendicular in space. A rigid connection is also possible. However, position-tolerant process units must be used. This means that the print heads must function in every spatial position, and the powder coater must be filled with particulate material at least in the layer production area. Compared to a system having a chain, this device may have a simpler design. To take into account the angle of repose of the particulate material, the wheel must generally have a very large design.

The features described above are part of the invention not only in their special combination as described but are understood in such a way that any of these features may also be combined according to the invention with any of the other features described here, or they may be combined with all or a portion thereof.

LIST OF REFERENCE NUMERALS

100 Print head
101 Coater
102 Building platform
103 Component
104 Build container
105 Print head path
106 Coater path
107 Powder layers
108 Direction of building platform movement
109 Dosed droplets
110 Powder roll
111 Build space boundary
112 Coater gap
113 Coater stock
200 IR emitter
800 Conveyor belt
900 Continuous positioning unit
1000 Wheel, including process units

What is claimed is:

1. A method for producing three-dimensional models by means of a layering technique comprising the steps of:

dispensing a defined layer of a particulate build material to a build space;
selectively applying a binder fluid to the build material;
moving the build space by a certain amount; and
repeating these steps until a desired object is produced,
wherein a first coater, a second coater, and a print head on a right side of the first coater and on a left side of the second coater move together are used for forming the layers;
wherein the second coater is a leading coater and the first coater is a trailing coater when moving from left to right; the second coater is the trailing coater and the first coater is the leading coater when moving from right to left;
wherein the trailing coater deposits the particulate build material and the leading coater is prevented from depositing particulate build material.

2. The method of claim 1, wherein
the binder fluid is applied from the print head.

3. The method of claim 2, wherein
the trailing coater follows the print head at a defined distance; and
the steps of dispensing the particulate build material and applying the binder fluid take place essentially simultaneously.

4. The method of claim 1, wherein the method includes a step of applying a vibration to the trailing coater.

5. The method of claim 4, wherein the method includes preventing or reducing transmission of the vibration to the leading coater or to the print head.

6. The method of claim 4, wherein the method includes preventing or reducing transmission of the vibration to the leading coater and the print head.

7. The method of claim 4, wherein more than two print coaters are used and a print head is between each pair of adjacent coaters.

8. The method of claim 4, wherein the print head is a line head.

9. A device for producing three-dimensional models by means of a layering technique, the device comprising:
a first coater and a second coater; and
a print head on a left side of the first coater and on a right side of the second coater;
wherein the first coater, the second coater, and the print head move simultaneously,
so that the second coater is a leading coater and the first coater is a trailing coater when moving from left to right, and the second coater is the trailing coater and the first coater is the leading coater when moving from right to left,
wherein the trailing coater deposits particulate material and the leading coater is prevented from depositing particulate material.

10. The device of claim 9, wherein the device applies a vibration to the trailing coater.

11. The device of claim 10, wherein the device prevents or reduces transmission of the vibration to the leading coater or the print head.

12. The device of claim 10, wherein the device prevents or reduces transmission of the vibration to the leading coater and the print head.

13. The device of claim 9, wherein the device includes more than two coaters and a print head is between each pair of adjacent coaters.

14. The device of claim 9, wherein the print head is a line head.

15. A method for producing three-dimensional models by means of a layering technique comprising the steps of:
dispensing a defined layer of a particulate build material to a build space by one or more coaters;
selectively applying a binder fluid to the build material by a print head;
moving the build space by a certain amount; and
repeating these steps until a desired object is produced,
wherein the steps of dispensing the particulate build material and applying the binder fluid take place essentially simultaneously,
wherein the method includes applying a vibration to one of the one or more coaters and reducing or preventing the transmission of the vibration to the print head or to a different coater.

16. The method of claim 15, wherein the one or more coaters includes a first coater on a left side of the print head and a second coater on a right side of the print head, wherein the second coater is a leading coater and the first coater is a trailing coater when moving from left to right; the second coater is the trailing coater and the first coater is the leading coater when moving from right to left;
wherein the vibration is applied to the trailing coater for depositing the particulate build material and the leading coater is prevented from depositing the particulate build material.

17. A method for producing three-dimensional models by means of a layering technique comprising the steps of:
dispensing a defined layer of a particulate build material to a build space;
selectively applying a binder fluid to the build material;
moving the build space by a certain amount; and
repeating these steps until a desired object is produced,
wherein multiple coaters and multiple print heads are used for forming multiple layers in one pass;
wherein the multiple layers are built on a continuously operating conveyor unit.

18. The method of claim 17, wherein the method is an inclined printing method.

19. The method of claim 18, wherein the multiple coaters and the multiple print heads are disposed in a continuous system.

20. The method of claim 19, wherein the continuous system includes a vertical carousel or a wheel.

21. A device for producing three-dimensional models by means of a layering technique, wherein the device includes two coaters and a print head between the two coaters which move simultaneously in forward and reverse directions, wherein the device applies vibrations to one of the two coaters and the device reduces or prevents transfer of the vibrations to the print head or to the other coater.

22. The device of claim 21, wherein the print head is a line head.

* * * * *